United States Patent
Yan et al.

(10) Patent No.: US 10,904,196 B2
(45) Date of Patent: Jan. 26, 2021

(54) TASK ASSISTANT

(71) Applicant: Yva.ai, Inc., Santa Clara, CA (US)

(72) Inventors: David Yan, Portola Valley, CA (US); Victor Bocharov, Saint Petersburg (RU); Polina Kananykina, Moscow (RU); Anton Gordienko, Moscow (RU); Victor Kuznetsov, Moscow (RU); Aleksandr Mertvetsov, Moscow (RU)

(73) Assignee: YVA.AI, INC., Menlo Park, CA (US)

( * ) Notice: Subject to any disclaimer, the term of this patent is extended or adjusted under 35 U.S.C. 154(b) by 0 days.

(21) Appl. No.: 16/785,147

(22) Filed: Feb. 7, 2020

(65) Prior Publication Data
US 2020/0177536 A1    Jun. 4, 2020

Related U.S. Application Data

(63) Continuation of application No. 15/691,311, filed on Aug. 30, 2017, now Pat. No. 10,560,417.

(60) Provisional application No. 62/382,190, filed on Aug. 31, 2016.

(51) Int. Cl.
| | |
|---|---|
| H04L 12/58 | (2006.01) |
| H04L 29/06 | (2006.01) |
| G06F 40/211 | (2020.01) |
| G06F 40/30 | (2020.01) |
| G08B 21/24 | (2006.01) |
| G06F 40/295 | (2020.01) |

(52) U.S. Cl.
CPC ............ *H04L 51/26* (2013.01); *G06F 40/211* (2020.01); *G06F 40/295* (2020.01); *G06F 40/30* (2020.01); *G08B 21/24* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 2009/0150507 | A1* | 6/2009 | Davis | H04L 51/14 709/207 |
| 2011/0172989 | A1* | 7/2011 | Moraes | G06Q 30/0251 704/9 |
| 2012/0258691 | A1* | 10/2012 | Baer | H04M 1/72563 455/412.2 |
| 2014/0229571 | A1* | 8/2014 | Buddenbaum | H04L 67/10 709/217 |
| 2016/0249319 | A1* | 8/2016 | Dotan-Cohen | H04M 3/42365 |
| 2016/0314496 | A1* | 10/2016 | Yuksel | H04L 51/20 |

(Continued)

OTHER PUBLICATIONS

International Search Report and Written Opinion for PCT Application PCT/US2017/049751, dated Nov. 16, 2017, 10 pages.

*Primary Examiner* — Philip J Chea
*Assistant Examiner* — Hassan A Khan
(74) *Attorney, Agent, or Firm* — Lowenstein Sandler LLP

(57) ABSTRACT

A task assistant identifies a correspondence received by a source associated with a user and determines that the correspondence includes a request. The task assistant further determines a ranking associated with the request based on one or more characteristics of the request and of the correspondence. In response to the ranking of the request exceeding a threshold, the task assistant generates a notification associated with the request and provides the notification to a client device associated with the user.

20 Claims, 5 Drawing Sheets

(56) References Cited

U.S. PATENT DOCUMENTS

2017/0118348 A1* 4/2017 Dotan-Cohen ... H04M 3/42365
2018/0063062 A1* 3/2018 Burdakov ............. H04L 67/306

* cited by examiner

TASK ASSISTANT

RELATED APPLICATIONS

This application is a continuation of U.S. patent application Ser. No. 15/691,311 filed on Aug. 30, 2017 and issued as U.S. Pat. No. 10,560,417 on Feb. 11, 2020, which claims the benefit of U.S. Provisional Patent Application No. 62/382,190, filed on Aug. 31, 2016, the entire contents of each of which are hereby incorporated by reference herein.

TECHNICAL FIELD

This disclosure generally relates to natural language processing (NLP), and more specifically to processing user correspondence using NLP to assist users with keeping track of requests that are incorporated into the user correspondence.

BACKGROUND

Information overload is fast becoming one of the biggest problems affecting people's lives. One of the main sources of this overload is daily correspondence from a multitude of communication channels—email messages, text messages, voice messages, etc. Much of this correspondence includes requests that need to be fulfilled. For example, a person may be requested to review a report, call a client, confirm a payment, prepare a document, schedule a meeting, participate in closing a deal, provide an estimate for completing a project, and so on. As a result, a person may need to sort through the correspondence that incorporates those requests, understand the meaning of the requests and make sure that none of the requests are overlooked. In addition, a person may need to delegate some of these requests to others and make sure that the delegated requests are completed on time. Handling of incoming and outgoing requests has become very time consuming and has negatively affected individual and enterprise productivity.

BRIEF DESCRIPTION OF THE DRAWINGS

The present disclosure is illustrated by way of example, and not by way of limitation, in the figures of the accompanying drawings.

DETAILED DESCRIPTION

Figure 1:
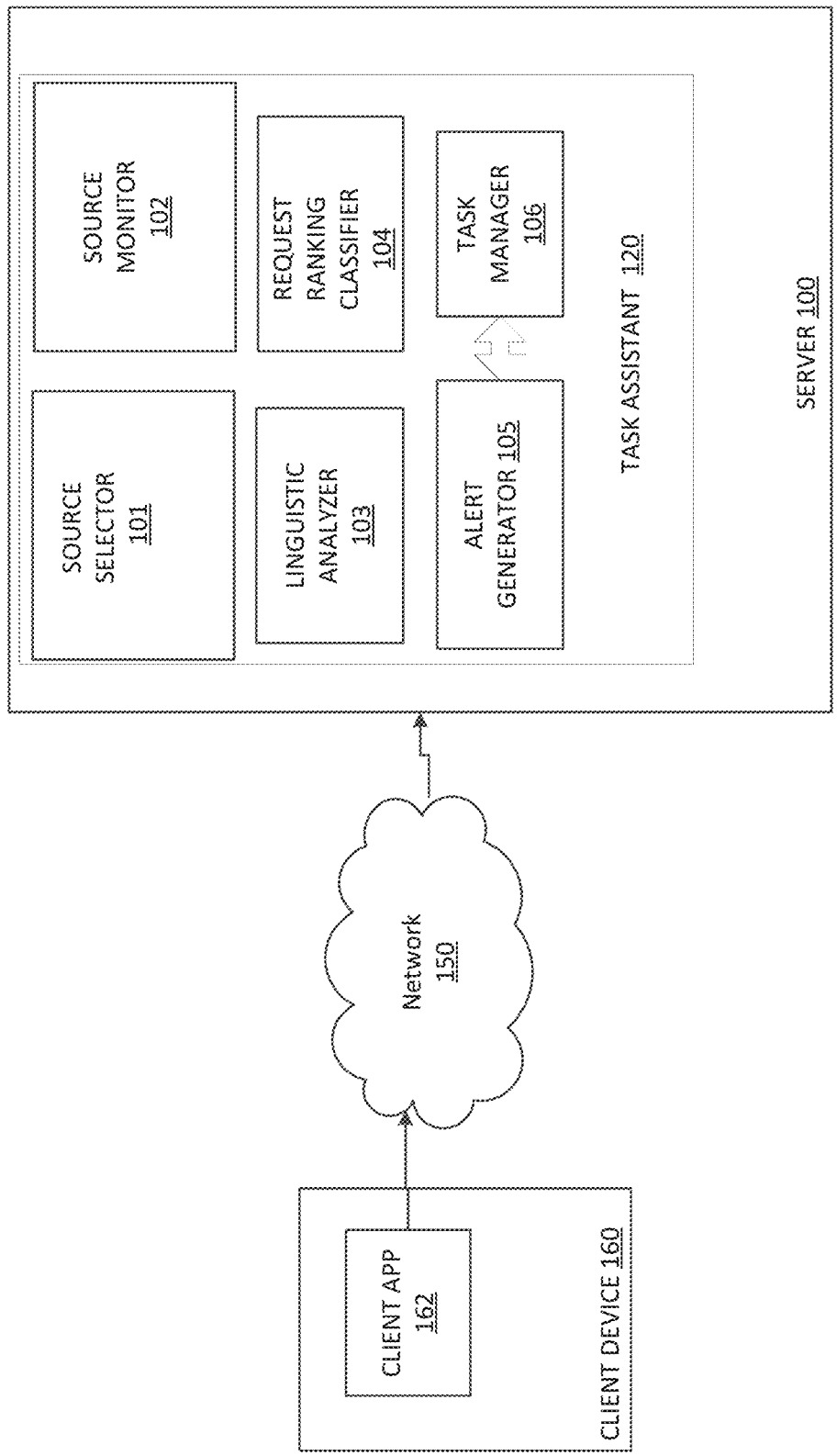
FIG. 1 is a system providing assistance with correspondence of users, in accordance with some implementations.

The present disclosure provides a task assistant (TA) designated to "remind" users of time-sensitive tasks received via various communication channels, which the users may have overlooked. The TA may determine that a particular correspondence is important (e.g., has been sent by an important contact of a user, has a close deadline, pertains to an important aspect of company business, etc.), and identify requests included in that correspondence (e.g. "finish that report by next Friday") that have not yet been replied to or completed. The TA can automatically send an alert to a user via a messenger, a social network post, or other communication channels, where the user can see them sooner and with higher probability.

In particular, according to some implementations, the TA can connect multiple data stores used by various communication channels (e.g., emails, files, contacts, notes, tasks, social networks, etc.) into a single platform, index data from the connected data stores and extract necessary metadata from the indexed data. The TA can also apply semantic analysis to the bodies of incoming messages to determine whether they include requests or tasks that need to be fulfilled.

In some implementations, the TA can rank the requests by their relative importance based on, for example, importance of a sender, sentiment analysis, included deadlines, previous actions of the user, etc. The importance of a sender can be deducted, for example, based on the frequency of communications between the user and the sender, the speed of the user's reaction to the sender's correspondence, the title of the sender, the name of the sender's company, etc. A variety of sender's contact details can be merged into one contact information item and can be considered when evaluating the sender's importance.

In some implementations, the TA can detect whether the request or task has been fulfilled, and send a notification to the user accordingly. The notifications can be sent via a messenger (e.g., a social network messenger, SMS messenger, etc.), a social network post, or any other communication channel. In addition, the TA can automatically add the request or task to a task tracker or calendar, add a flagging indicator to the correspondence incorporating the request or task, or change the status of such a correspondence. In some implementations, the TA can automatically execute a request/task, or suggest a reply to a request. For example, the TA can determine what type of information is requested, search for this information in the connected data stores, and suggest a reply including the found information to the user.

In some implementations, the TA can monitor correspondence of the user to other users to identify requests or tasks assigned to the other users. The TA can then rank these outgoing requests/tasks based on the importance of contacts associated with tasks/requests, completion deadlines, sentiment analysis, previous actions of the user, etc. The TA can detect whether the request or task has been completed, and send a notification to the requesting user or the user whom the request/task was assigned via a messenger (e.g., a social network messenger, SMS messenger, etc.), a social network post, or any other communication channel.

Accordingly, aspects of the present disclosure assist users with addressing information overload by tracking requests/tasks incorporated into correspondence received by the users, prioritizing these requests/tasks, and providing appropriate and timely replies to the requests. Additionally, aspects of the present disclosure assist users with tracking requests/tasks delegated by the users to others, and ensuring that the delegated requests/tasks are completed on time.

FIG. 1 illustrates an exemplary system architecture in which implementations of the present disclosure may operate. The system architecture may include a server 100 coupled to one or more client devices 160 via a network 150. The network 150 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. The system architecture may also include one or more data stores (not shown) that each can be a memory (e.g., random access memory), a cache, a drive (e.g., a hard drive), a flash drive, a database system, or another type of component or device capable of storing data. The data stores may also include multiple storage components (e.g., multiple drives or multiple databases) that may also span multiple computing devices (e.g., multiple server computers). The client devices 160 may each include computing devices such as personal computers (PCs), laptops, mobile phones, smart phones, tablet computers, netbook computers, network-connected televisions, etc. The server 100 may include one or more computing devices (e.g., a rackmount server, a server computer, etc.). The system architecture may also include third party systems such as one or more email systems, one or more messaging systems, one or more social network systems, one or more document management systems, one or more reporting systems, etc.

The data stores may be used by third party systems to store user correspondence and other documents. In certain cases, correspondence may have an unstructured data format or a structured data format. Correspondence having an unstructured data format can include, for example, email messages, text messages, files, attachments, faxes or images with text, voice messages, etc. Correspondence having a structured data format can include, for example, records from services such as Salesforces CRM, Jira Bug reporting, Asana Task Management, etc. While the present disclosure refers mostly to unstructured full-text data, with email messages as a main example, the techniques described herein can similarly apply to a wide variety of other unstructured and structured correspondence.

In one implementation, the server 100 includes a task assistant (TA) 120 which communicates with a client component 162 on each client device 160. TA 120 may be a server-based application performing the functionality described herein. The client component 162 can be, for example, a browser, a mobile application (app), a messenger bot, or any other module or program capable of communicating with TA 120 via the network 150.

In one implementation, TA 120 includes a source selector 101, a source monitor 102, a linguistic analyzer 103, a request ranking classifier 104, an alert generator 105 and a task manager 106. It should be noted that in other implementations TA 120 may include more or fewer components than those shown in FIG. 1. In one implementation, source selector 101 can communicate with the client component 162 to identify, based on user input, data stores used by email systems, messaging systems, social network systems, document management systems, reporting systems, etc. Source selector 101 may also determine a preferred alert channel. In one implementation, the alert channel is explicitly specified by the user via the client component 162. In another implementation, TA 120 determines the most appropriate channel automatically. For example, source selector 101 can monitor the usage of the various available channels and identify one of the channels that is used most frequently in a certain context. The context may include the content of the communication, the timing of the communication, the length of the communication, the recipient or sender of the communication, etc. Thus, based on previous activities for correspondence having the same or similar context, source selector 101 can identify an appropriate channel for future correspondence. In yet another implementation, TA 120 can select the alert channel automatically, but can later change it as a result of interactions with the user. For example, if TA 120 selects Skype messaging as a channel, but the user requests (e.g., via Skype messaging) an SMS channel, TA 120 can change the alert channel to SMS. In some implementations, the user can communicate with TA 120 as they would with a regular messaging system contact (e.g., via natural language texts such as "send my alerts via SMS").

In one implementation, source monitor 102 monitors all incoming and outgoing correspondences, and passes new correspondences to linguistic analyzer 103. Linguistic analyzer 103 extracts word chains which can indicate requests or tasks. Such word chains can include phrases such as "could you please update," "what time works," "will it work for," "I'd like to ask you to," etc. In order to detect and extract applicable word chains, linguistic analyzer 103 can use predefined templates describing syntactic structures for variations of requests, and build syntactic and semantic interpretations based on the templates. In one embodiment, linguistic analyzer can use supervised machine learning to improve the recognition of word chains indicating requests or tasks over time. For example, linguistic analyzer 103 may receive a set of training data including correspondence having a known classification as either including a request or task or not. Linguistic analyzer 103 can implement a learning algorithm to analyze the training data and generate an inferred function to be applied to new correspondence. A human operator can also provide feedback on classifications performed by linguistic analyzer 103 over time to refine the inferred function.

Request ranking classifier 104 can assign a ranking to each request, defining which requests should be sent to the alert channel and in what order. A ranking can be based on, for example, word chain classification (content); the contact's importance; previous actions involving the given correspondence; the due date, etc. In some implementations, request ranking classifier 104 extracts the following information from the request/task: a contact who sent the relevant correspondence, the content of the request (what needs to be done), who has to do it, and by what date. Request ranking classifier 104 can then determine a ranking of the request based on the importance of the contact, the importance of the content of the request, the deadline for the request, and previous actions of the user. In one embodiment, the various extracted categories of information can be given a weighting value to define their importance relative to one another. In one embodiment, the categories have default weighting values (e.g., where the due date is weighted as most important). In other embodiments, a user can configure the weighting values according to their own preferences (e.g., to have the contact who sent the request be weighted as most important).

Contact importance can change dynamically, and, in one implementation, can be based on a set of parameters, which may include, for example: how many channels of the user the contact appears on; how frequently the user and the contact communicate; how quickly the user and the contact respond to each other's correspondences; the title of the contact, the company of the contact, celebrity status of the contact, etc. Importance of contacts can be compared based on rankings assigned to the contacts. One implementation of a method for ranking contacts of a user is discussed in greater detail below in conjunction with FIG. 4.

Content importance can be based on semantic analysis of the content that uses word chains as discussed above and weights some word chains higher than others. In one implementation, the Naïve Bayes text classification method may be used to detect words and expressions denoting importance. Alternatively, machine learning methods may be used in order to determine importance. In some implementations, supervised machine learning methods may rely on user feedback with respect to request rankings for expanding training sets. Such feedback may be provided by a user via alert channels by confirming importance of a request, or indicating a failure to detect a request, and its importance. In some implementations, an add-on or a plug-in for an existing communication application may be provided in order to simplify the process of providing negative or positive feedback. In one implementation, additional filtering may be performed in order to distinguish between non-request statements (e.g., statements in the form of politeness (e.g. "please find attached"), rhetorical questions, and other statements that may look similar to a request) and actual requests.

For example, a sentence "Huge problem, house on fire" can have an increased weight. In one implementation, a "sentiment" analysis can also be used to determine/adjust the importance of the content. For example, the tone of the email can be analyzed to determine whether it is strict, anxious, humorous, etc., and to adjust the importance accordingly.

Correspondence history or actions with a specific contact may affect request ranking. In one implementation, correspondence with the same contact is analyzed for unusual or contact specific patterns. For example, the correspondence may have been sent at midnight, whereas the contact usually communicates during the daytime. In another example, the contact may be frequently using "ASAP" in his or her correspondence, which should diminish the weight of such a term when determining the request ranking. In yet another example, the use of unusual recipients (e.g., in To:/CC: recipient's lists) in the contact's correspondence can affect the request ranking. In still another example, words denoting importance or urgency which were seldom used by the contact can be used to increase the request ranking. In one implementation, in order to enable said functionality, a contact specific inverted index may be implemented. In one implementation, a low-priority or zero-priority ranking can be assigned to the request if a previous action or actions indicate that the request has been completed (e.g. a requested file has been already sent).

If available, Due Date is extracted from the correspondence, and is used for ranking. In an implementation, if the due date is not explicitly defined, machine learning methods can be used to estimate the time needed for performing a certain task. In some implementations, supervised machine learning algorithms may rely on user feedback with respect to extracted due dates in order to expand the training set. Such feedback may be provided by the user via alert channels by confirming the extracted due dates, indicating a failure to extract the correct due date, or specifying a due data in order to train the system. In some implementations, an add-on or a plug-in for an existing communication application may be provided in order to simplify the negative or positive feedback process.

Due Date can be expressed as "absolute date" (e.g. May 1, 2016), or "relative" (e.g., next Thursday, the day after tomorrow, and so on). The absolute due date may be calculated based on the relative due date. In one implementation, information from previous interactions with the contact may be used. For example, if the user answered to the previous correspondence of the contact within an hour, a one hour deadline may be used for the subsequent responses.

In some implementations, request ranking classifier 104 can modify the assigned rankings in response to the user's request to change the priority of certain tasks, or to stop sending certain type of alerts.

Figure 3:
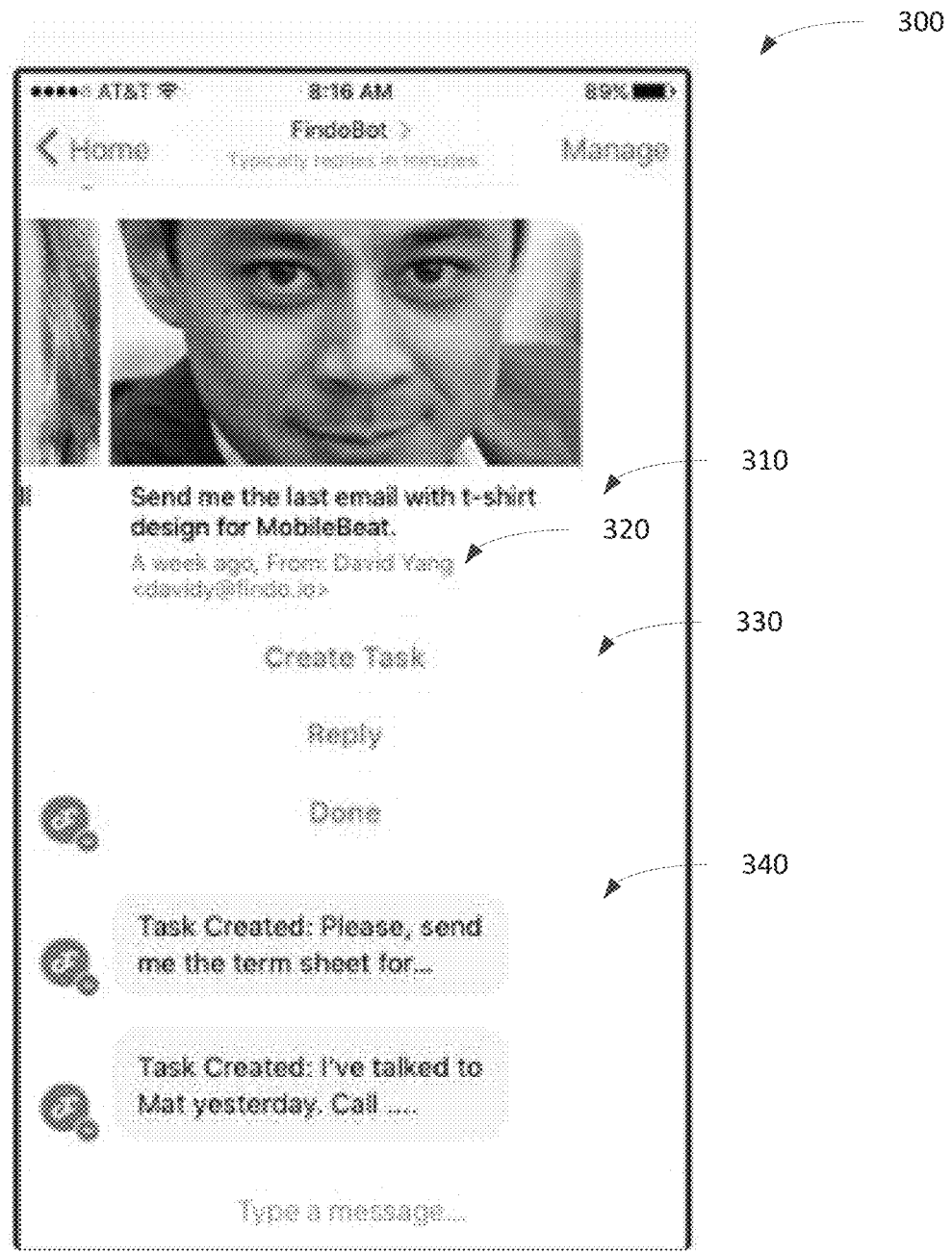
FIG. 3 is an example graphical user interface (GUI) provided by a task assistant, in accordance with some implementations of the disclosure.

Alert generator 105 can use rankings of the requests to prioritize the requests, determine what requests should trigger alerts, generate these alerts and send the alerts to the user via the alert channel. The user is provided with several options, which include but are not limited to (see FIG. 3 illustrating a screenshot of one implementation):

Disregard the alert (i.e., cancel it), or mark the request as completed. Sometimes TA 120 may not be able to automatically detect whether the request has been completed, and the request can to be "closed" manually.

Reply to/execute the request immediately.

Create a task which contains a due date and is monitored by task manager 106, alerting the user when appropriate. Task manager 106 can monitor the tasks, and periodically send notifications regarding outstanding tasks, or tasks approaching due dates.

Send feedback. TA 120 is adaptive, and can correct its future actions based on user feedback. Examples of feedback—"this person is not important", or "this was not a request, but a joke." The feedback can be used to automatically retrain the classifier, adjust word chain templates, or adjust contacts' profiles indicating contact's importance.

In one implementation, TA 120 attempts to understand the meaning of the request and assists in executing the request. For example, a contact may ask to send a particular presentation. Since the user has provided TA 120 with all his sources of information, and the sources are indexed, the request becomes a search request. If an appropriate document is found, the user has a choice to send it as is, or find and send a correct document.

Figure 2:
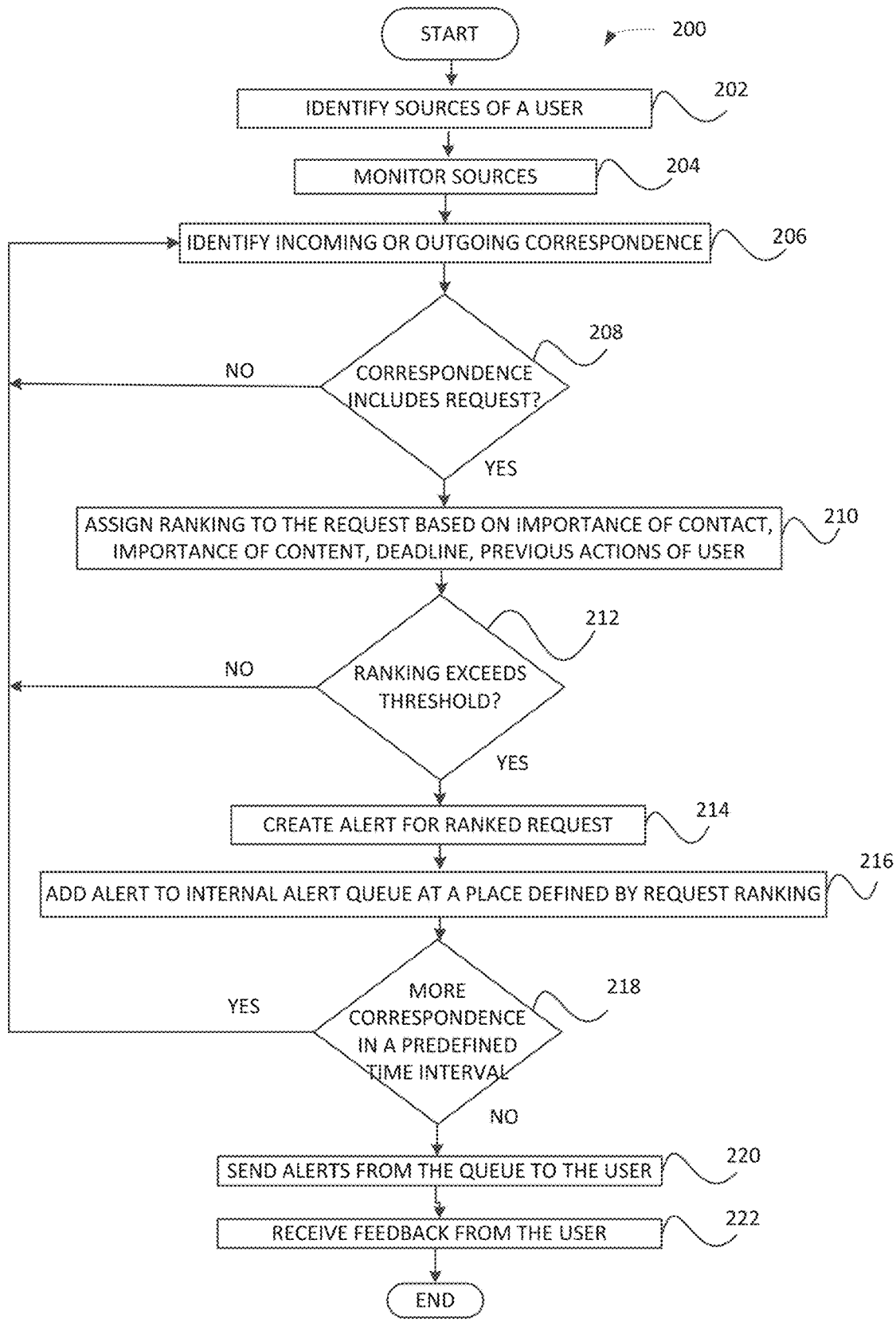
FIG. 2 is a flow diagram of one implementation of a method for monitoring incoming correspondence, and sending alerts to users if the correspondence contains highly ranked requests.

FIG. 2 is a flow diagram of one implementation of a method 200 for monitoring incoming correspondence, and sending alerts to users if the correspondence contains highly ranked requests.

Method 200 begins at block 202 with TA 120 identifying sources of a user as described above. TA then monitors the sources of the user (block 204) and identifies correspondence received by the user from the user's contacts (i.e., incoming correspondence) or correspondence sent by the user to the user's contacts (i.e., outgoing correspondence) from different sources (block 206).

For the identified correspondence, TA 120 determines if a particular correspondence includes a request or task (block 208). If not, TA 120 proceeds to the next correspondence. If the correspondence does include a request or task, at block 211, TA 120 assigns a ranking to the request or task based on the importance ranking of the contact (sender or recipient), the importance of the content, the deadline of the request, and previous actions of the user and/or the contact, as discussed herein. Next, at block 212, TA 120 determines if the ranking of the request or task meets or exceeds a threshold. In one embodiment, an alert is not generated for all requests or tasks. For example, an alert may only be generated if the ranking of the request or task exceeds the threshold. Depending on the embodiment, the threshold may have a default value or may be configurable by the user. In one embodiment, for example, alerts may only be generated for the 100 highest ranked requests or tasks (i.e., the threshold is set at 100). In other embodiments, the threshold may be set at some other value. If the ranking does not meet or exceed the threshold, TA 120 proceeds to the next correspondence. If the ranking of the request does meet or exceed a threshold, TA 120 creates an alert for the ranked request (block 214), and places the alert in an alert queue at a position defined by the ranking of the alert (block 216). In one embodiment, all alerts are placed in the alert queue for processing. Alert generator 105 may retrieve an item from the alert queue in a sequential order. Thus, the position at which the item is placed in the alert queue can define the order in which a corresponding alert is generated. In one embodiment, the alert may be placed in an order according to the alert, ensuring that higher ranked alerts are processed sooner than lower ranked alerts. At block 218, TA 120 determines whether there is more correspondence within a predefined time interval. If so, TA 120 then proceeds to the next correspondence, and blocks 206 through 216 are repeated for the next correspondence until all user correspondence is processed. Depending on the embodiment, the time interval may be set at different values, including for example, 30 minutes. The predefined time interval prevents the sending of numerous alerts if there are multiple correspondences that are sent or received in a short time period. By waiting until the predefined timer interval has passed, TA 120 can limit notifications to one alert. If there is no more correspondence within the time interval, at block 220, TA 120 sends alerts from the queue to the user (e.g., as a text message, an email, etc.). The alerts may be sent to the user based on their position in the queue, as discussed in more detail above. TA 120 may further receive feedback from the user in response to the alert (block 222). Such feedback may be provided by a user via alert channels by confirming importance of a request, or indicating a failure to detect a request, and its importance.

FIG. 3 is an example graphical user interface (GUI) 300 provided by TA, in accordance with some implementations of the disclosure. In one embodiment, GUI 300 illustrates an identified correspondence which includes a request 310 (i.e., "Send me the last email with t-shirt design for MobileBeat"). In addition, to a copy of the request 310 itself, GUI 300 further includes information 320 about the correspondence containing the request. In one embodiment, this information 320 includes a time when the request was received (i.e., "a week ago") and an indication of the sender of the request (i.e., "David Yan <davidy@findo.io>"). In addition, GUI 300 includes a number of action buttons 330 which can receive user input to initiate a corresponding action with respect to the request. The action buttons 330 can include, for example, "Create Task," "Reply," and "Done." A selection of the "Create Task" button may cause TA 120 to create a task corresponding to the request 310 and add the task to a calendar, task list, or other data store. A selection of the "Reply" button may cause TA 120 to generate a reply to the sender of the correspondence identified in information 320. A selection of the "Done" button may cause TA 120 to dismiss the task as being complete or unnecessary to be tracked further. In other embodiments, GUI 300 may include different or additional action buttons. Furthermore, GUI 300 may include a conversation 340 associated with the request 310. The conversation 340 may include, for example, additional communications between the user and the sender of the correspondence. In addition, the conversation 340 may include notes associated with the processing of the request 310 (e.g., "Task Created").

Figure 4:
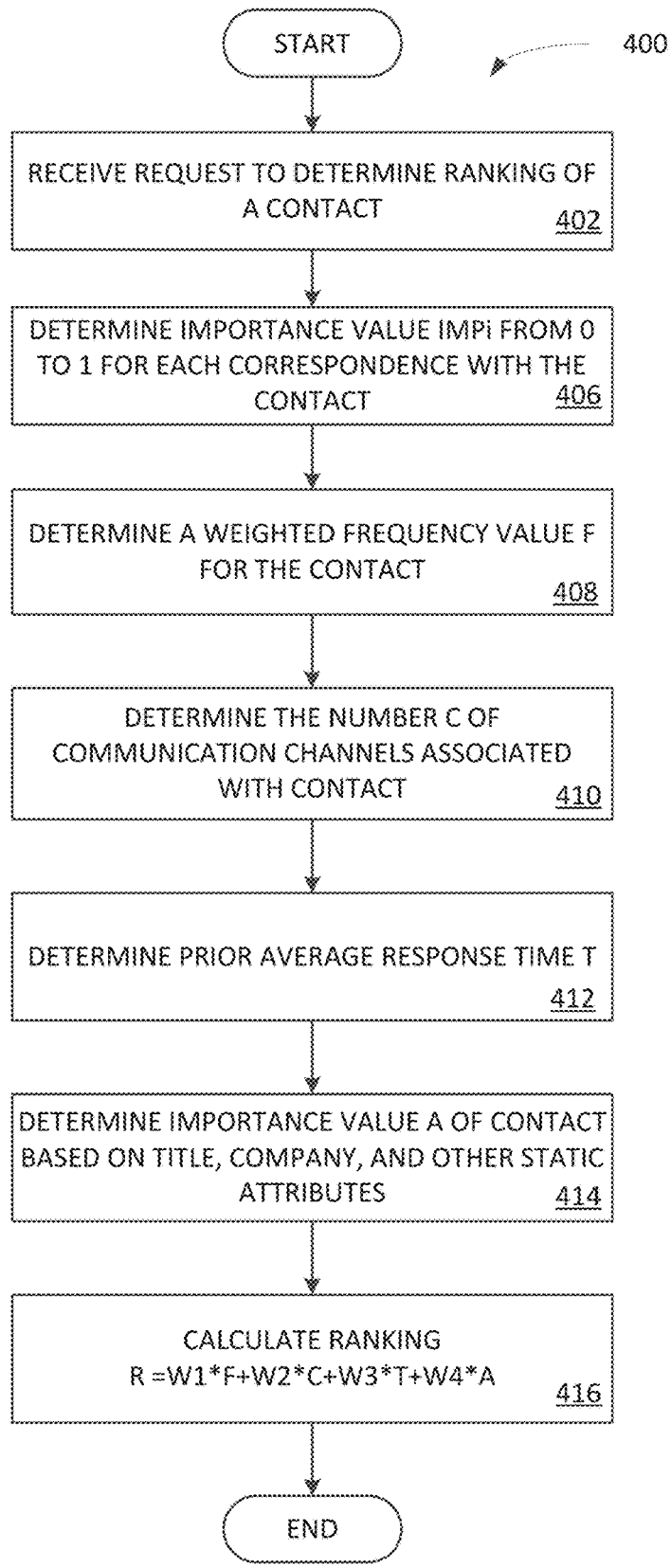
FIG. 4 is a flow diagram of one implementation of a method for ranking contacts of a user.

FIG. 4 is a flow diagram illustrating a method 400 of determining ranking of a contact in accordance with some implementations of the present disclosure. At block 402, TA 120 receives a request to determine the ranking of a contact. At block 406, TA 120 determines an importance value IMPi of each correspondence or content associated with the contact. In one embodiment, the importance can be determined on the basis of how quickly a user replies to the emails or other requests of the request sender. In another embodiment, if the importance of the sender can be determined on the basis of some other information from internal or external sources, such as a website, that indicate whether the sender is a well-known person, or on the basis of a title in the senders signature (e.g., CEO, CIO etc), or other content of the email which helps to understand that this sender has an important corporate or social position. In one implementation, the importance value may be expressed as a binary value 0 or 1, where a correspondence of zero importance can be discarded from the consideration. In another implementation, the importance value may vary from 0 to 1.

At block 408, TA 120 determines the weighted frequency F of the correspondence exchanged with a certain contact for a given period of time as a sum of all importance values. The period of time may be a predetermined period of time consistent across all contacts of a given user. At block 410, TA 120 determines the number of communication channels C. The channels may include, for example, multiple email channels, messaging channels, content sharing channels, phone communication channels, etc. In one embodiment, the number of communication channels includes an indication of how many different channels have been used for correspondence between the user and a particular one of the user's contacts. In one embodiment, when the user has communicated with a contact using a higher number of different channels (e.g., email, phone, messaging, social media), this may be an indication that the contact is of greater importance than a contact with which the user has communicated using only a single channel (e.g., email).

At block 412, TA 120 determines an average response time T of the user to the contact's requests and of the contact to the user's requests based on the history of communications between the user and the contact. In one implementation, the outgoing correspondence response time may be weighted higher, as it reflects the urgency of the responses.

At block 414, TA 120 determines a static contact value based on certain contact attributes. The contact attributes may include, for example, the title of the contact, the company name, the celebrity status, etc. In one implementation, TA 120 may maintain profiles for the user's contacts, and the above static contact attributes may be stored in the contact's profile.

Finally, at block 416, TA 120 calculates the ranking R of a contact. In one implementation, the ranking is calculated as a weighted sum of values determined in previous blocks. Weights W1, W2, W3, W4 can be predefined based on experimentations, or, in another implementation, derived from the user's feedback using machine learning methods. The ranking may be updated regularly in order to account for new correspondences and reduce the importance of old correspondences. In one implementation, contacts from multiple sources—address book, cloud depositories, emails, etc.—can be aggregated using the following methods:

Parsing of the full name to extract the name and surname.
Use of phonetic and Levensthein distance based algorithms to merge names with errors in spelling.
Parsing of the phone numbers (the country code, city etc.) for proper phone comparisons.
Comparison of email addresses.
Assessment of name validity based of incoming and outgoing correspondence statistics.
Obtaining additional data about the contact from social networks.

Figure 5:
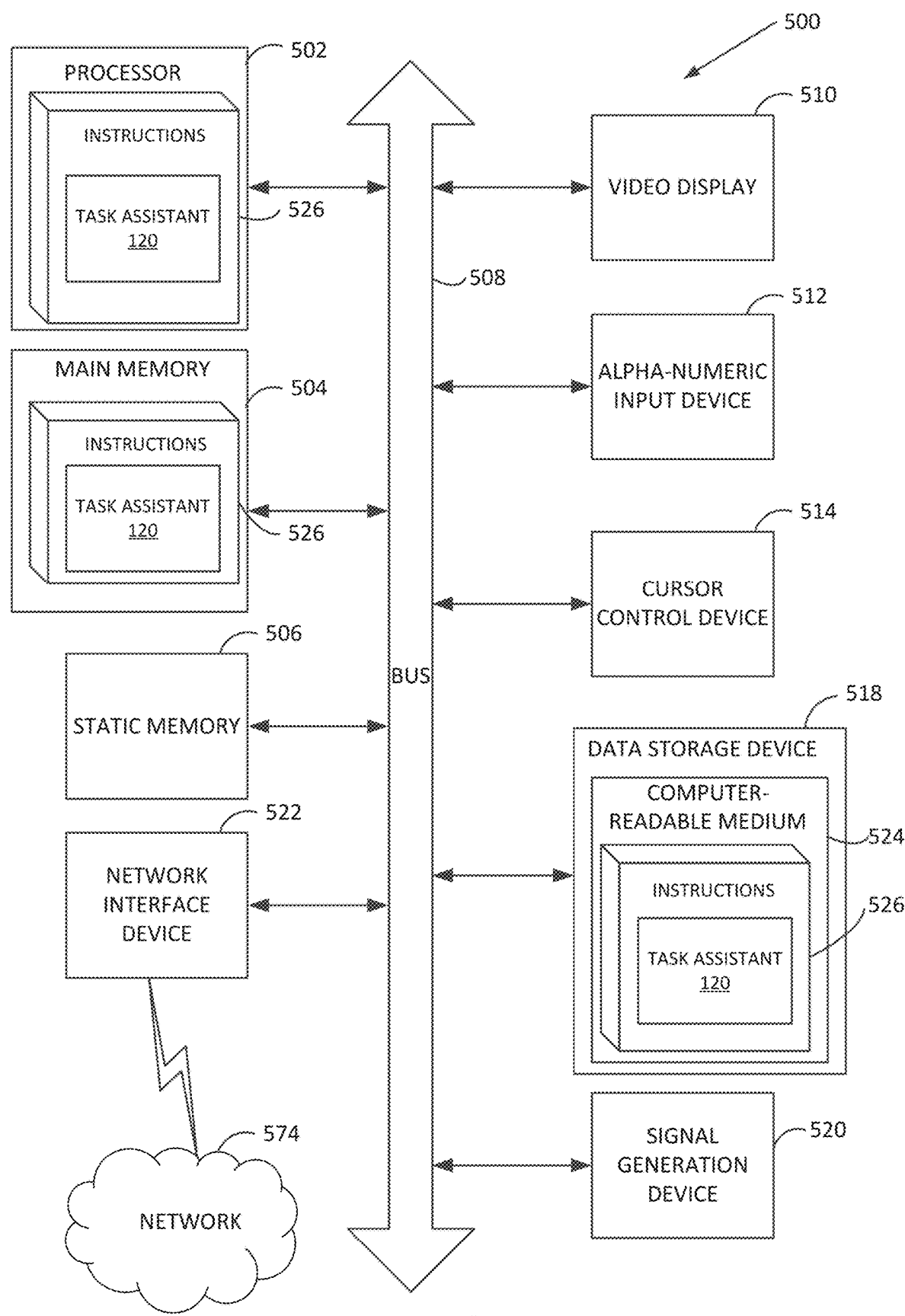
FIG. 5 is an example computer system in which aspects of the present disclosure can be implemented.

FIG. 5 depicts a block diagram of a computer system operating in accordance with one or more aspects of the present disclosure. In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding task assistant 120 of FIG. 1 and for implementing method 200 or method 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "detecting," "determining," "initiating," "creating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform the method and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying a correspondence received by a source associated with a user;
   determining, by a processing device, that the correspondence includes a request;
   determining, by the processing device, a ranking associated with the request based on a weighted sum of one or more characteristics of the request and of the correspondence;
   responsive to the ranking of the request exceeding a threshold, creating an alert associated with the request;
   adding the alert to an alert queue at a location in the queue defined by the ranking of the request;
   determining whether further correspondence is received by the source within a predefined time interval after a first time at which the correspondence was received; and responsive to no further corresponding being received within the predefined time interval, sending the alert associated with the request from the alert queue to a client device associated with the user.

2. The method of claim 1, further comprising:
identifying a plurality of sources associated with the user, the plurality of sources to send and receive correspondence; and
monitoring the plurality of sources to identify the correspondence.

3. The method of claim 1, wherein determining that the correspondence includes a request comprises:
extracting a word chain from the correspondence; and
identifying a syntactic structure of the request in the word chain that matches a predefined request template.

4. The method of claim 1, wherein determining the ranking associated with the request comprises:
identifying a contact from whom the correspondence was received; and
calculating a weighted sum of an importance of past correspondence with the contact, a number of communication channels associated with the contact, an average response time to prior requests from the contact and a static attribute importance value of the contact.

5. The method of claim 1, wherein the one or more characteristics comprises at least one of an importance of a contact from whom the correspondence was received, sentiment analysis, a deadline reference in the correspondence, previous actions of the user, frequency of prior correspondence with the contact, response time to prior requests from the contact, a title of the contact, or a name of the contact's company.

6. The method of claim 1, wherein sending the alert associated with the request from the alert queue to the client device associated with the user comprises retrieving one or more alerts from the alert queue in a sequential order.

7. The method of claim 1, further comprising:
receiving feedback from the user to confirm an importance of a request, modify an importance of a request, or indicate a failure to detect a request in the correspondence.

8. A system comprising:
a memory; and
a processing device, operatively coupled to the memory, the processing device to:
identify a correspondence received by a source associated with a user;
determine that the correspondence includes a request;
determine a ranking associated with the request based on a weighted sum of one or more characteristics of the request and of the correspondence;
responsive to the ranking of the request exceeding a threshold, creating an alert associated with the request;
add the alert to an alert queue at a location in the queue defined by the ranking of the request;
determine whether further correspondence is received by the source within a predefined time interval after a first time at which the correspondence was received; and
responsive to no further corresponding being received within the predefined time interval, send the alert associated with the request from the alert queue to a client device associated with the user.

9. The system of claim 8, wherein the processing device further to:
identify a plurality of sources associated with the user, the plurality of sources to send and receive correspondence; and
monitor the plurality of sources to identify the correspondence.

10. The system of claim 8, wherein to determine that the correspondence includes a request, the processing device to:
extract a word chain from the correspondence; and
identify a syntactic structure of the request in the word chain that matches a predefined request template.

11. The system of claim 8, wherein to determine the ranking associated with the request, the processing device to:
identify a contact from whom the correspondence was received; and
calculate a weighted sum of an importance of past correspondence with the contact, a number of communication channels associated with the contact, an average response time to prior requests from the contact and a static attribute importance value of the contact.

12. The system of claim 8, wherein the one or more characteristics comprises at least one of an importance of a contact from whom the correspondence was received, sentiment analysis, a deadline reference in the correspondence, previous actions of the user, frequency of prior correspondence with the contact, response time to prior requests from the contact, a title of the contact, or a name of the contact's company.

13. The system of claim 8, wherein to send the alert associated with the request from the alert queue to the client device associated with the user, the processing device to retrieve one or more alerts from the alert queue in a sequential order.

14. The system of claim 8, wherein the processing device further to:
receive feedback from the user to confirm an importance of a request, modify an importance of a request, or indicate a failure to detect a request in the correspondence.

15. A non-transitory computer-readable storage medium storing instructions which, when executed, cause a processing device to:
identify a correspondence received by a source associated with a user;
determine that the correspondence includes a request;
determine a ranking associated with the request based on a weighted sum of one or more characteristics of the request and of the correspondence;
responsive to the ranking of the request exceeding a threshold, creating an alert associated with the request;
add the alert to an alert queue at a location in the queue defined by the ranking of the request;
determine whether further correspondence is received by the source within a predefined time interval after a first time at which the correspondence was received; and
responsive to no further corresponding being received within the predefined time interval, send the alert associated with the request from the alert queue to a client device associated with the user.

16. The non-transitory computer-readable storage medium of claim 15, wherein the instructions further cause the processing device to:
identify a plurality of sources associated with the user, the plurality of sources to send and receive correspondence; and
monitor the plurality of sources to identify the correspondence.

17. The non-transitory computer-readable storage medium of claim 15, wherein to determine that the correspondence includes a request, the processing device to:
- extract a word chain from the correspondence; and
- identify a syntactic structure of the request in the word chain that matches a predefined request template.

18. The non-transitory computer-readable storage medium of claim 15, wherein to determine the ranking associated with the request, the processing device to:
- identify a contact from whom the correspondence was received; and
- calculate a weighted sum of an importance of past correspondence with the contact, a number of communication channels associated with the contact, an average response time to prior requests from the contact and a static attribute importance value of the contact.

19. The non-transitory computer-readable storage medium of claim 15, wherein the one or more characteristics comprises at least one of an importance of a contact from whom the correspondence was received, sentiment analysis, a deadline reference in the correspondence, previous actions of the user, frequency of prior correspondence with the contact, response time to prior requests from the contact, a title of the contact, or a name of the contact's company.

20. The non-transitory computer-readable storage medium of claim 15, wherein to send the alert associated with the request from the alert queue to the client device associated with the user, the instructions cause the processing device to retrieve one or more alerts from the alert queue in a sequential order.

* * * * *